(12) United States Patent
Yoshiyama

(10) Patent No.: US 9,383,845 B2
(45) Date of Patent: *Jul. 5, 2016

(54) ELECTROOPTIC DEVICE HAVING INPUT FUNCTION

(71) Applicant: Japan Display Inc., Tokyo (JP)

(72) Inventor: Atsushi Yoshiyama, Nagano (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/619,766

(22) Filed: Feb. 11, 2015

(65) Prior Publication Data

US 2015/0153864 A1 Jun. 4, 2015

Related U.S. Application Data

(63) Continuation of application No. 13/048,504, filed on Mar. 15, 2011, now Pat. No. 8,994,668.

(30) Foreign Application Priority Data

Mar. 19, 2010 (JP) ................................ P2010-063872

(51) Int. Cl.
*G06F 3/041* (2006.01)
*G06F 3/044* (2006.01)

(52) U.S. Cl.
CPC ................ *G06F 3/041* (2013.01); *G06F 3/044* (2013.01)

(58) Field of Classification Search
CPC .................................. G06F 3/041; G06F 3/044
See application file for complete search history.

(56) References Cited

U.S. PATENT DOCUMENTS

| 8,373,664 | B2 | 2/2013 | Wright | |
| 2006/0238517 | A1* | 10/2006 | King | G06F 1/1626 345/173 |
| 2009/0244028 | A1 | 10/2009 | Matsuo | |
| 2010/0053127 | A1* | 3/2010 | Takenaka | G02F 1/13452 345/204 |
| 2010/0226103 | A1 | 9/2010 | Muro et al. | |
| 2010/0259497 | A1* | 10/2010 | Livingston | H03K 17/962 345/173 |
| 2010/0315347 | A1 | 12/2010 | Hsieh et al. | |
| 2012/0032917 | A1 | 2/2012 | Yamaguchi | |

FOREIGN PATENT DOCUMENTS

| CN | 101414237 | 4/2009 |
| JP | 2009-259203 | 11/2009 |
| WO | 2010/126072 | 1/2001 |

OTHER PUBLICATIONS

Chinese Office Action issued Nov. 4, 2014 in corresponding Chinese Application No. 201110058270.4.
Japanese Office Action issued Aug. 13, 2013 in corresponding Japanese Patent Application.

* cited by examiner

*Primary Examiner* — Charles Hicks
(74) *Attorney, Agent, or Firm* — K&L Gates LLP

(57) ABSTRACT

Disclosed herein is an electrooptic device having an input function including: an electrooptic panel; a touch panel having an input position detecting electrode in an input area aligned to an image display area of the electrooptic panel; and a wiring board connected to any one of the electrooptic panel and the touch panel, the wiring board having a touch sensor located outside the input area of the touch panel as viewed from an input surface of the touch panel.

6 Claims, 5 Drawing Sheets

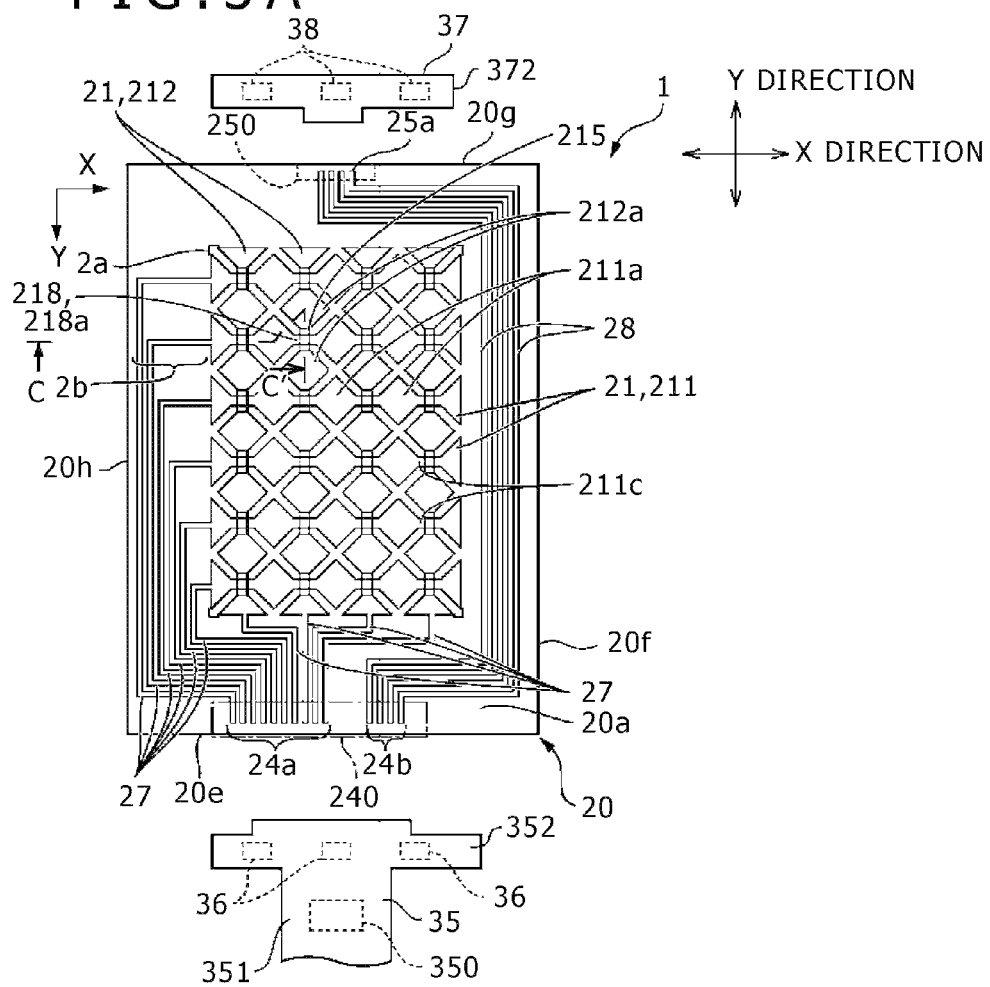
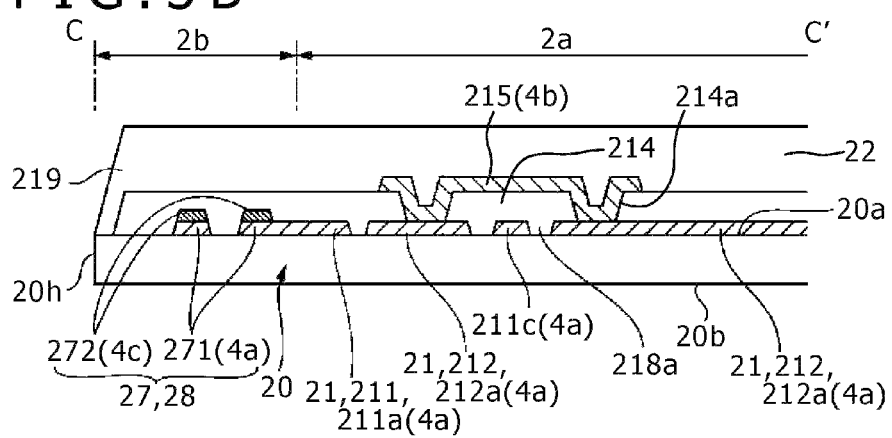

ELECTROOPTIC DEVICE HAVING INPUT FUNCTION

CROSS REFERENCES TO RELATED APPLICATIONS

The present application is a continuation of U.S. patent application Ser. No. 13/048,504, filed Mar. 15, 2011, which application claims priority to Japanese Priority Patent Application JP 2010-063872 filed with the Japan Patent Office on Mar. 19, 2010, the entire content of which is hereby incorporated by reference.

BACKGROUND

The present application relates to an electrooptic device having an input function, in which an input area is formed so as to be aligned to an image display area of an electrooptic panel.

In electronic equipment such as a mobile phone, car navigation system, personal computer, ticket vending machine, and bank terminal, a touch panel is provided on the front side of an electrooptic panel such as a liquid crystal panel, wherein an operator can input information through the touch panel as referring to an image displayed in an image display area of the electrooptic panel (see Japanese Patent Laid-open No. 2009-259203, for example).

SUMMARY

However, in the case that the input area of the touch panel is formed at only a position corresponding to the image display area of the electrooptic panel, the image displayed in the image display area may be concealed by an operator's finger every time the operator inputs information, causing the inconvenience to the operator. In the case that a plurality of touch panels are provided to eliminate such inconvenience, there arises a problem such that the electrooptic device is increased in size and the cost is also remarkably increased.

There is a need for the present application to provide an electrooptic device having an input function which allows the input of information also in any areas other than the image display area without increasing the size and cost of the electrooptic device.

In accordance with an embodiment, there is provided an electrooptic device having an input function including an electrooptic panel; a touch panel having an input position detecting electrode in an input area aligned to an image display area of the electrooptic panel; and a wiring board connected to any one of the electrooptic panel and the touch panel, the wiring board having a touch sensor located outside the input area of the touch panel as viewed from an input surface of the touch panel.

According to the embodiment, the wiring board connected to any one of the electrooptic panel and the touch panel has the touch sensor, and the touch sensor is located outside the input area (image display area) of the touch panel. Accordingly, in inputting through the touch sensor, there is no possibility that an image displayed in the image display area may be concealed by the finger, thereby improving the convenience to the operator. Further, it is sufficient that the input through the touch sensor may be secondary. Accordingly, the touch sensor may be simplified in configuration. As described above, the touch sensor is provided on the wiring board. Accordingly, unlike the configuration that a touch panel is added, a remarkable increase in size and cost can be prevented.

Preferably, the touch panel has a translucent board forming the input surface; and the input position detecting electrode and the touch sensor are located on the back side of the translucent board opposite to the input surface. Accordingly, the input to the input area of the touch panel and the input to the touch sensor can be made on the same input surface, thereby improving the convenience to the operator.

Preferably, the wiring board is connected to the touch panel. Accordingly, the wiring board having the touch sensor can be located nearer to the input surface. Therefore, the touch sensor can be easily located nearer to the input surface.

Preferably, the touch sensor includes a first touch sensor and a second touch sensor located outside the input area. In the case that one touch sensor is provided, a simple input can only be made through this touch sensor. To the contrary, the first and second touch sensors are provided according to this configuration of the present application. Accordingly, various kinds of input can be made through the first and second touch sensors, thereby improving the convenience to the operator.

Preferably, the first touch sensor is located along one end of the input area; and the second touch sensor is located along the other end of the input area opposite to the first touch sensor. Accordingly, the operator can input to the first and second touch sensors with both hands holding the electrooptic device.

Preferably, the wiring board includes a first wiring board connected to the touch panel, the first wiring board having the first touch sensor, and a second wiring board connected to the touch panel, the second wiring board having the second touch sensor; and the first wiring board and the second wiring board are electrically connected to each other through wiring formed on the touch panel. Accordingly, it is not necessary to route both the first and second wiring boards for the electrical connection therebetween.

Preferably, the first wiring board is electrically connected to the input position detecting electrode. Accordingly, driving of the first touch sensor and driving of the input position detecting electrode can be performed through the first wiring board.

Preferably, the first touch sensor and the second touch sensor are electrically connected to a common driving IC. Accordingly, only one driving IC is necessary for driving of the first and second touch sensors. Further, in the case that all of the first and second touch sensors and the input position detecting electrode are electrically connected to the common driving IC, driving of the first touch sensor, driving of the second touch sensor, and driving of the input position detecting electrode can be performed by the common driving IC.

Additional features and advantages are described herein, and will be apparent from the following Detailed Description and the figures.

BRIEF DESCRIPTION OF THE FIGURES

FIG. 3A is a schematic plan view of a sensor substrate and its associated parts used in the electrooptic device, and FIG. 3B is a schematic sectional view of the sensor substrate and its associated parts shown in FIG. 3A;

DETAILED DESCRIPTION

Figure 1A:
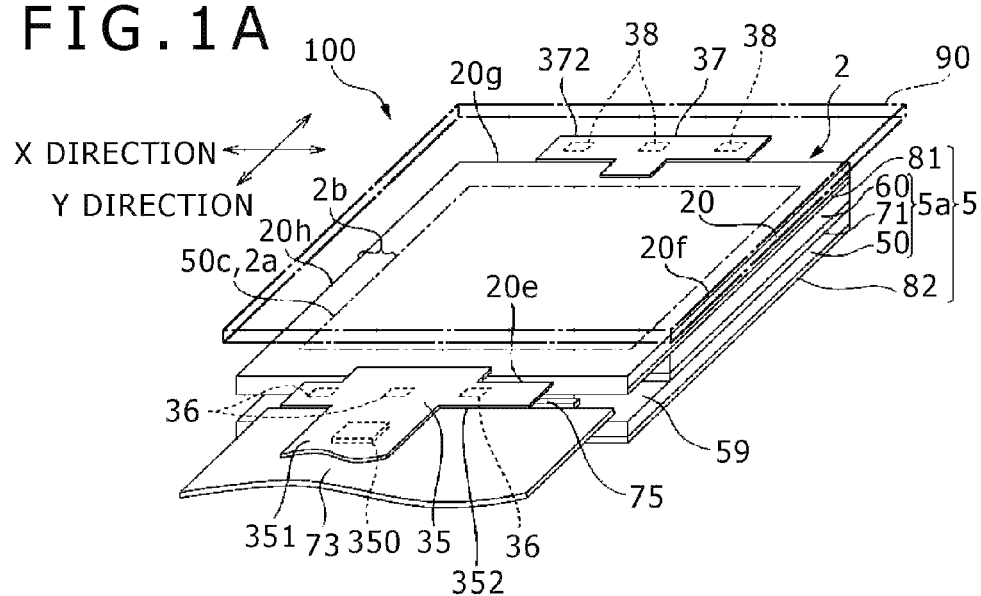
FIG. 1A is a schematic perspective view of an electrooptic device according to a preferred embodiment.

Embodiments of the present application will be described below in detail with reference to the drawings.

In the drawings, various layers and parts are shown with different scales in order to make the sizes of these layers and parts recognizable on the drawings.

General Configuration of the Electrooptic Device Having an Input Function

Figure 1B:
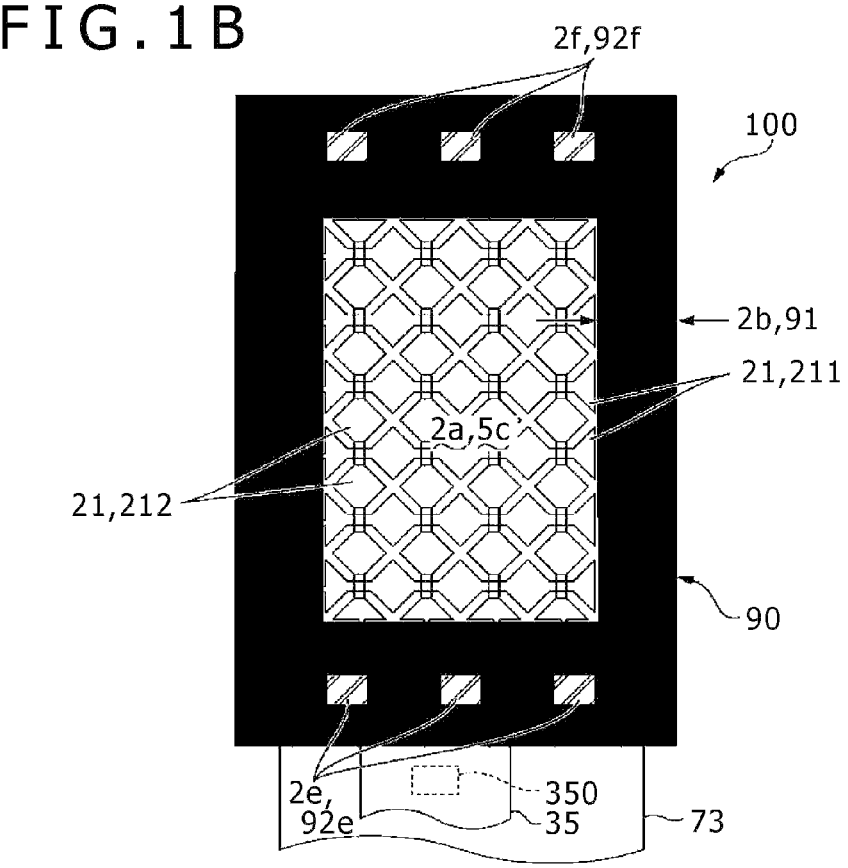
FIG. 1B is a schematic plan view of the electrooptic device shown in FIG. 1A.
Figure 2:
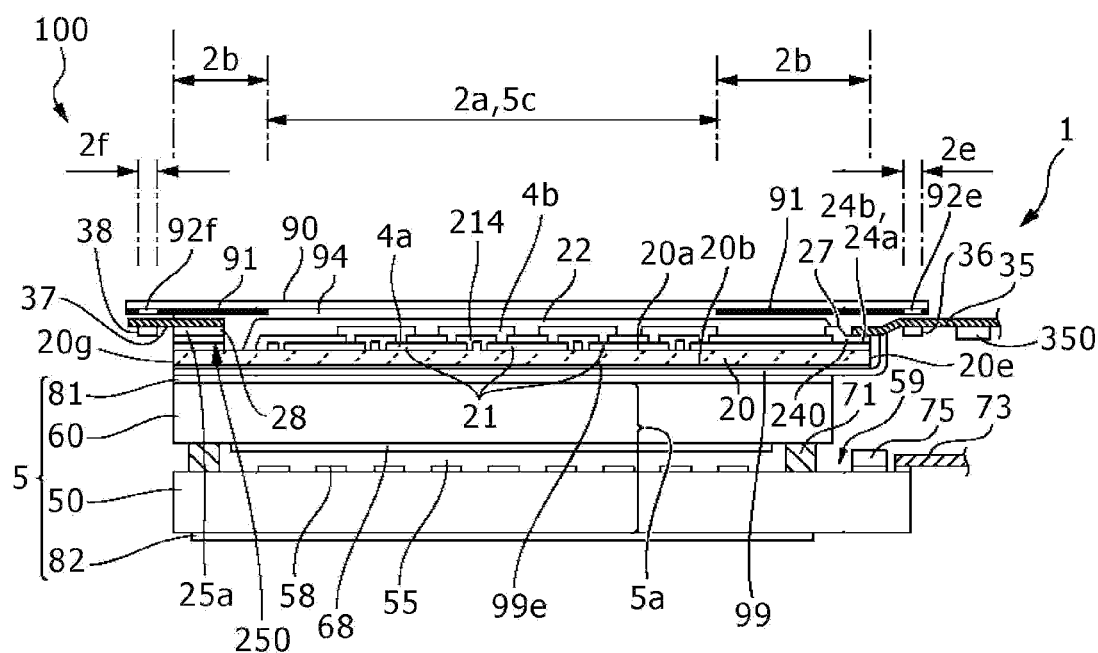
FIG. 2 is a schematic sectional view of the electrooptic device shown in FIGS. 1A and 1B.

FIGS. 1A and 1B are schematic views showing the general configuration of an electrooptic device 100 having an input function according to a preferred embodiment, wherein FIG. 1A is a perspective view of the electrooptic device 100 in the condition where a cover glass (translucent board) is removed, and FIG. 1B is a plan view of the electrooptic device 100 shown in FIG. 1A. FIG. 2 is a schematic sectional view of the electrooptic device 100 shown in FIGS. 1A and 1B.

Referring to FIGS. 1A and 1B and FIG. 2, the electrooptic device 100 is generally composed of an image forming unit 5 such as a liquid crystal display and an input unit 1 superimposed on one side of the image forming unit 5 from which display light is emitted. The input unit 1 includes a capacitance type touch panel 2, and the image forming unit 5 includes a liquid crystal panel as an electrooptic panel 5a (display panel). Both of the touch panel 2 and the electrooptic panel 5a are rectangular and flat in shape. As shown in FIG. 1B, the touch panel 2 has an input area 2a as a central area, and the electrooptic panel 5a has an image forming area (image display area) 5c aligned to the input area 2a. The rectangular touch panel 2 has four ends 20e, 20f, 20g, and 20h, and a flexible wiring board 73 is connected to the electrooptic panel 5a at its end portion corresponding to the end 20e of the touch panel 2.

The image forming unit 5 is a transmission type or semi-transmissive reflection type active matrix liquid crystal display. A backlight unit (not shown) is provided on the back side of the electrooptic panel 5a opposite to its front side where the touch panel 2 is provided (i.e., opposite to the light emission side where display light is emitted). For example, the backlight unit includes a translucent light guide plate superimposed on the back side of the electrooptic panel 5a opposite to its front side where the touch panel 2 is provided and a light source such as a light emitting diode for emitting white light or the like toward an end of the light guide plate. Accordingly, the light emitted from the light source enters the light guide plate from its one end and next propagates in the light guide plate, during which the light is emerged toward the electrooptic panel 5a. A sheetlike optical member such as a light scattering sheet or a prism sheet may be provided between the light guide plate and the electrooptic panel 5a.

The image forming unit 5 further includes a first polarizing plate 81 superimposed on the front side of the electrooptic panel 5a (i.e., the light emission side where display light is emitted) and a second polarizing plate 82 superimposed on the back side of the electrooptic panel 5a opposite to the front side thereof. The electrooptic panel 5a includes a translucent element substrate 50 provided on the back side opposite to the display light emission side and a translucent opposed substrate 60 provided on the front side as the display light emission side so as to be opposed to the element substrate 50. The opposed substrate 60 and the element substrate 50 are attached to each other by a rectangular framelike seal member 71 in such a manner that a rectangular space is defined between the opposed substrate 60 and the element substrate 50 so as to be surrounded by the seal member 71. A liquid crystal layer 55 is retained in this rectangular space. A plurality of pixel electrodes 58 are formed on the upper surface of the element substrate 50 opposed to the opposed substrate 60 as viewed in FIG. 2. The pixel electrodes 58 are formed from a translucent conductive film such as an ITO (Indium Tin Oxide) film or an IZO (Indium Zinc Oxide) film. A common electrode 68 is formed on the lower surface of the opposed substrate 60 opposed to the element substrate 50 as viewed in FIG. 2. The common electrode 68 is also formed from a translucent conductive film such as an ITO film. Further, the opposed substrate 60 is formed with a color filter. In the case that the electrooptic panel 5a is of an IPS (In Plane Switching) type or an FFS (Fringe Field Switching) type, the common electrode 68 is provided on the element substrate 50 side. Further, the element substrate 50 may be provided on the display light emission side of the opposed substrate 60. The element substrate 50 has an extended area 59 extended from one end of the opposed substrate 60. A driving IC 75 is mounted on the extended area 59 by a COG method, and a flexible wiring board 73 is connected to the extended area 59. A driving circuit may be formed together with switching elements on the element substrate 50.

Detailed Configuration of the Capacitance Type Input Unit

In the input unit 1 shown in FIG. 2, the touch panel 2 includes a sensor substrate 20 formed from a glass substrate. For example, a glass substrate having a thickness of 0.2 mm is used as the sensor substrate 20. In the following description, one side of the sensor substrate 20 where electrodes etc. are formed will be referred to as a first surface 20a, and the other side of the sensor substrate 20 opposite to the first surface 20a will be referred to as a second surface 20b.

As described later in detail, a first translucent conductive film 4a, an interlayer insulating film 214, a second translucent conductive film 4b, and a translucent overcoat layer 22 are formed on the first surface 20a of the sensor substrate 20 so as to be layered in this order from the lower side as viewed in FIG. 2. A plurality of input position detecting electrodes 21 are formed by the first translucent conductive film 4a. A cover glass 90 formed of chemically tempered glass is attached to the input side of the sensor substrate 20 (upper side as viewed in FIG. 2) by an adhesive 94. A light shielding layer 91 having a black color is printed on the cover glass 90 in its peripheral area corresponding to a peripheral area 2b formed outside the input area 2a of the sensor substrate 20. That is, the area surrounded by the light shielding layer 91 is formed as the input area 2a. While the first surface 20a of the sensor substrate 20 is oriented to the input side of the touch panel 2 in this preferred embodiment, the second surface 20b of the sensor substrate 20 may be oriented to the input side of the touch panel 2.

A shielding conductive film 99 is provided between the touch panel 2 and the electrooptic panel 5a. The shielding conductive film 99 is composed of a translucent base film and a translucent conductive film such as an ITO film formed on the translucent base film. The conductive film 99 is bonded to the sensor substrate 20 by an adhesive layer 99e. The conductive film 99 functions to prevent that a potential change in the electrooptic panel 5a may have an influence as noise on the input position detecting electrodes 21. In the case that a sufficient distance can be ensured between the electrooptic panel 5a and the input position detecting electrodes 21, the conductive film 99 may be omitted.

Configuration of the Electrodes etc. in the Input Unit

FIGS. 3A and 3B are schematic views showing the general configuration of the sensor substrate 20 and its associated parts used in the electrooptic device 100, wherein FIG. 3A is a plan view of the sensor substrate 20 and its associated parts, and FIG. 3B is a sectional view of the sensor substrate 20 and its associated parts shown in FIG. 3A. In FIG. 3A, the corner positions of the input area 2a are shown by L-shaped marks. FIG. 3B is a schematic cross section taken along the line C-C' in FIG. 3A.

As shown in FIG. 3A, a plurality of first electrodes 211 for input position detection are formed on the first surface 20a of the sensor substrate 20 in the capacitance type input unit 1 so as to be arranged in the X direction (first direction) in the input area 2a. Similarly, a plurality of second electrodes 212 for input position detection are formed on the first surface 20a of the sensor substrate 20 so as to be arranged in the Y direction (second direction) intersecting the X direction in the input area 2a. These first electrodes 211 and these second electrodes 212 constitute the input position detecting electrodes 21.

Further, first wiring 27 is formed on the first surface 20a of the sensor substrate 20 in the peripheral area 2b surrounding the input area 2a so as to extend from one end of each first electrode 211 and also extend from one end of each second electrode 212.

Further, second wiring 28 is formed on the first surface 20a of the sensor substrate 20 in the peripheral area 2b so as to extend from the end 20g to the end 20e of the sensor substrate 20. The second wiring 28 functions as wiring for touch sensors to be hereinafter described. The light shielding layer 91 having a black color shown in FIGS. 1B and 2 is superimposed on the first wiring 27 and the second wiring 28 so as to conceal them from the input side of the touch panel 2. As shown in FIG. 1B, the light shielding layer 91 is partially blanked to form other printed layers 92e and 92f having any colors other than black. These printed layers 92e and 92f respectively correspond to input positions 2e and 2f for the touch sensors to be hereinafter described.

As shown in FIG. 3B, the first translucent conductive film 4a, the interlayer insulating film 214, the second translucent conductive film 4b, and the overcoat layer 22 are formed on the first surface 20a of the sensor substrate 20 so as to be layered in this order from the lower side as viewed in FIG. 3B. Further, each of the first wiring 27 and the second wiring 28 is composed of a lower wiring layer 271 formed from the first translucent conductive film 4a and an upper wiring layer 272 formed from a metal layer 4c, wherein the upper wiring layer 272 is formed on the upper surface of the lower wiring layer 271. In the configuration of the first wiring 27 and the second wiring 28, the metal layer 4c may be formed on the lower side of the first translucent conductive film 4a.

In this preferred embodiment, the first translucent conductive film 4a is formed from a polycrystalline ITO film. The interlayer insulating film 214 is formed on the upper side of the first translucent conductive film 4a. The interlayer insulating film 214 is formed from a translucent insulating film such as a photosensitive resin film or a silicon oxide film. The second translucent conductive film 4b is also formed from a polycrystalline ITO film as similar to the first translucent conductive film 4a. In some case, a translucent base protective layer may be formed over the first surface 20a of the sensor substrate 20. The translucent base protective layer is formed from a silicon oxide film, for example. In this case, the first translucent conductive film 4a and the second translucent conductive film 4b are sequentially formed on the translucent base protective layer.

The first translucent conductive film 4a is formed as a plurality of rhombic areas in the input area 2a. These rhombic areas constitute a plurality of pad portions 211a and 212a (large-area portions) of the input position detecting electrodes 21 (the first electrodes 211 and the second electrodes 212). These pad portions 211a and 212a are arranged alternately in zigzag in the X direction and the Y direction. In the plural pad portions 211a, the adjacent ones 211a in the X direction (first direction) are connected through a connecting portion 211c. Thus, the pad portions 211a and the connecting portions 211c constitute the first electrodes 211 extending in the X direction. In contrast, the plural pad portions 212a constitute the second electrodes 212 extending in the Y direction (second direction). However, the adjacent ones of the plural pad portions 212a in the Y direction are not connected with each other at a portion 218a overlapping the connecting portion 211c.

The interlayer insulating film 214 is formed in a wide area including the input area 2a and the peripheral area 2b. The interlayer insulating film 214 is formed with contact holes 214a corresponding to the end portions of the adjacent pad portions 212a opposed to each other through the disconnected portion 218a. The second translucent conductive film 4b is formed as a plurality of interconnecting electrodes 215 on the upper surface of the interlayer insulating film 214 so as to fill the contact holes 214a. The overcoat layer 22 of photosensitive resin or the like is formed on the upper surface of the second translucent conductive film 4b so as to almost fully cover the upper side of the sensor substrate 20.

In the capacitance type input unit 1 as described above, the first electrodes 211 and the second electrodes 212 are formed by the same conductive film (the first translucent conductive film 4a) and extend in the intersecting directions (in the X direction and the Y direction), so that a plurality of intersections 218 of the first electrodes 211 and the second electrodes 212 are present on the sensor substrate 20. The first electrodes 211 are connected to each other in the X direction by the connecting portions 211c at the intersections 218. In contrast, the second electrodes 212 are not connected to each other in the Y direction at the disconnected portions 218a, i.e., at the intersections 218. However, the interconnecting electrode 215 is formed on the interlayer insulating film 214 at each intersection 218 so as to electrically connect the adjacent pad portions 212a (the second electrodes 212) through the contact holes 214a of the interlayer insulating film 214. Accordingly, the second electrodes 212 extend in the Y direction so as to be electrically connected to each other in the Y direction. Each interconnecting electrode 215 overlaps the corresponding connecting portion 211c through the interlayer insulating film 214, thereby eliminating the possibility of a short circuit.

Configuration of the Touch Sensor and its Peripheral Parts

As shown in FIGS. 2, 3A, and 3B, the first wiring 27 formed on the first surface 20a of the sensor substrate 20 has a plurality of mounted terminals 24a located at the end 20e of the sensor substrate 20. The area of the first surface 20a where the mounted terminals 24a are located is a mounting area 240 for connecting a first flexible wiring board 35 on which a driving IC 350 is mounted. Accordingly, the first flexible wiring board 35 and the driving IC 350 are electrically connected through the first wiring 27 to the input position detecting electrodes 21. An end portion of the conductive film 99 is electrically connected to the first flexible wiring board 35.

On the other hand, the second wiring 28 formed on the first surface 20a of the sensor substrate 20 has a plurality of mounted terminals 24b located at the end 20e of the sensor substrate 20. As similar to the mounted terminals 24a, the mounted terminals 24b are also located in the mounting area 240. Accordingly, the first flexible wiring board 35 is electrically connected to the mounted terminals 24a and the mounted terminals 24b. The second wiring 28 further has a plurality of mounted terminals 25a located at the end 20g of the sensor substrate 20. The area of the first surface 20a where the mounted terminals 25a are located is a mounting area 250 for connecting a second flexible wiring board 37. Accordingly, the second flexible wiring board 37 is electrically connected through the second wiring 28 to the first flexible wiring board 35 and the driving IC 350.

The first flexible wiring board 35 has one surface (lower surface as viewed in FIG. 2) on which a plurality of (three in this preferred embodiment) first touch sensors 36 are formed. The first touch sensors 36 are electrically connected to the driving IC 350. The first flexible wiring board 35 has a body portion 351 extending from an end position where it is connected to the sensor substrate 20 to a position where the driving IC 350 is mounted and a laterally extending portion 352 extending laterally from the body portion 351 along the end 20e of the sensor substrate 20. The three first touch sensors 36 are formed in the laterally extending portion 352 so as to be spaced in its longitudinal direction.

Similarly, the second flexible wiring board 37 has one surface (lower surface as viewed in FIG. 2) on which a plurality of (three in this preferred embodiment) second touch sensors 38 are formed. The second touch sensors 38 are electrically connected through the second wiring 28 and the first flexible wiring board 35 to the driving IC 350. The second flexible wiring board 37 has a laterally extending portion 372 extending laterally from an end position where it is connected to the sensor substrate 20 along the end 20g of the sensor substrate 20. The three second touch sensors 38 are formed in the laterally extending portion 372 so as to be spaced in its longitudinal direction.

The first flexible wiring board 35 is connected to the mounting area 240 of the sensor substrate 20 so that the three first touch sensors 36 are respectively aligned to the three printed layers 92e of the cover glass 90 in a portion of the peripheral area 2b between the input area 2a and the end 20e, and is fixed by the adhesive 94. Similarly, the second flexible wiring board 37 is connected to the mounting area 250 of the sensor substrate 20 so that the three second touch sensors 38 are respectively aligned to the three printed layers 92f of the cover glass 90 in a portion of the peripheral area 2b between the input area 2a and the end 20g, and is fixed by the adhesive 94.

The first touch sensors 36 and the second touch sensors 38 are capacitance type touch sensors, and they are provided by electrodes formed from a copper foil constituting conductor patterns in the first flexible wiring board 35 and the second flexible wiring board 37. When a finger approaches any one of the printed layers 92e and 92f of the cover glass 90, a parasitic capacitance in the corresponding one of the first touch sensors 36 and the second touch sensors 38 changes, so that the approach of the finger to any one of the printed layers 92e and 92f of the cover glass 90 can be detected. Accordingly, the printed layers 92e of the cover glass 90 correspond to the input positions 2e for the first touch sensors 36, and the printed layers 92f of the cover glass 90 correspond to the input positions 2f for the second touch sensors 38.

Input Position Detecting Method

When the driving IC 350 outputs a rectangular pulse-shaped position detecting signal to the input position detecting electrodes 21 in the input unit 1, a signal having the same waveform as that of the position detecting signal applied to the input position detecting electrodes 21 is detected in the case that no parasitic capacitance is present in the input position detecting electrodes 21. In contrast, when a parasitic capacitance is present in the input position detecting electrodes 21, waveform distortion due to the parasitic capacitance occurs, so that the driving IC 350 can detect the presence of the parasitic capacitance in the input position detecting electrodes 21. When a finger approaches any one of the plural input position detecting electrodes 21, a capacitance in this input position detecting electrode 21 approached by the finger increases by the amount corresponding to a capacitance generated between the finger and this electrode 21. Accordingly, the driving IC 350 can determine this electrode 21 (input position) approached by the finger. As a result, although the input position detecting electrodes 21 are formed on the back side of the cover glass 90 opposite to the input side, the input to the electrodes 21 can be detected by the touch of the finger to the cover glass 90 in the input area 2a. For example, when the finger approaches a predetermined position in the input area 2a, a switch or the like displayed in the input area 2a can be selected.

Further, when the driving IC 350 outputs a rectangular pulse-shaped position detecting signal to the first touch sensors 36 and the second touch sensors 38, a signal having the same waveform as that of the position detecting signal applied to the first touch sensors 36 and the second touch sensors 38 in the case that no parasitic capacitance is present in the first touch sensors 36 and the second touch sensors 38. In contrast, when a parasitic capacitance is present in the first touch sensors 36 and the second touch sensors 38, waveform distortion due to the parasitic capacitance occurs, so that the driving IC 350 can detect the presence of the parasitic capacitance in the first touch sensors 36 and the second touch sensors 38. When a finger approaches any one of the plural first touch sensors 36 and the plural second touch sensors 38, a capacitance in this touch sensor approached by the finger increases by the amount corresponding to a capacitance generated between the finger and this touch sensor. Accordingly, the driving IC 350 can determine this touch sensor (input position) approached by the finger. As a result, although the first touch sensors 36 and the second touch sensors 38 are formed on the back side of the cover glass 90 opposite to the input side, the input to the first and second touch sensors 36 and 38 can be detected by the touch of the finger to the cover glass 90 in the peripheral area 2b. For example, when the finger approaches a predetermined position in the peripheral area 2b, an instruction of switching a part of an image displayed or an instruction of scrolling can be made according to which of the first and second touch sensors 36 and 38 is approached by the finger. Further, an instruction to the content of switching of a part of an image displayed or an instruction to the direction of scrolling can be made according to the direction of movement of the finger along the array of the three first touch sensors 36 and the array of the three second touch sensors 38.

Primary Effects of this Preferred Embodiment

In the electrooptic device 100 according to this preferred embodiment mentioned above, the first and second flexible wiring boards 35 and 37 connected to the touch panel 2 include the first and second touch sensors 36 and 38, respectively. The first and second touch sensors 36 and 38 are located outside the input area 2a (image display area 5c) of the touch panel 2. Accordingly, in inputting through the first and second touch sensors 36 and 38, there is no possibility that an image displayed in the image display area 5c may be concealed by the finger, thereby improving the convenience to the operator. Further, it is sufficient that the input through the first and second touch sensors 36 and 38 may be secondary. Accordingly, the first and second touch sensors 36 and 38 may be simplified in configuration. As described above, the first and second touch sensors 36 and 38 are provided on the first and second flexible wiring boards 35 and 37, respectively. Accordingly, unlike the configuration that a touch panel is added, a remarkable increase in size and cost can be prevented.

Further, the touch panel 2 includes the cover glass 90 (translucent board) forming the input surface. The input position detecting electrodes 21 and the first and second touch sensors 36 and 38 are located on the back side of the cover glass 90 opposite to the input surface. Accordingly, the input to the input area 2a of the touch panel 2 and the input to the first and second touch sensors 36 and 38 can be made on the same input surface, thereby improving the convenience to the operator.

As described above, the first and second flexible wiring boards 35 and 37 connected to the touch panel 2 include the first and second touch sensors 36 and 38, respectively. Accordingly, as compared with the case that the flexible wiring board 73 connected to the electrooptic panel 5a includes touch sensors, the wiring boards with touch sensors (the first and second flexible wiring boards 35 and 37) can be located nearer to the input surface. Therefore, the first and second touch sensors 36 and 38 can be easily located nearer to the input surface.

In the case that one touch sensor is provided, a simple input can only be made through this touch sensor. To the contrary, the plural first touch sensors 36 and the plural second touch sensors 38 are provided outside the input area 2a according to this preferred embodiment. Accordingly, an instruction to the direction of scrolling on the screen, for example, can be made through the first touch sensors 36 and the second touch sensors 38, thereby improving the convenience to the operator. Further, the first touch sensors 36 are located along one end of the input area 2a and the second touch sensors 38 are located along the other end of the input area 2a opposite to the first touch sensors 36. Accordingly, the operator can input to the first and second touch sensors 36 and 38 with both hands holding the electrooptic device 100.

The first flexible wiring board 35 and the second flexible wiring board 37 are electrically connected to each other through the second wiring 28 formed on the sensor substrate 20 of the touch panel 2. Accordingly, in driving the first touch sensors 36 and the second touch sensors 38, it is not necessary to route both the first flexible wiring board 35 and the second flexible wiring board 37. The second touch sensors 38 can be electrically connected to the driving IC 350 mounted on the first flexible wiring board 35 without routing the second flexible wiring board 37. Further, the first flexible wiring board 35 having the first touch sensors 36 is also electrically connected to the input position detecting electrodes 21. Accordingly, all of the input position detecting electrodes 21, the first touch sensors 36, and the second touch sensors 38 can be electrically connected to the common driving IC 350. That is, driving of the first touch sensors 36, driving of the second touch sensors 38, and driving of the input position detecting electrodes 21 can be performed by the common driving IC 350.

Modification of this Preferred Embodiment

Figure 4:
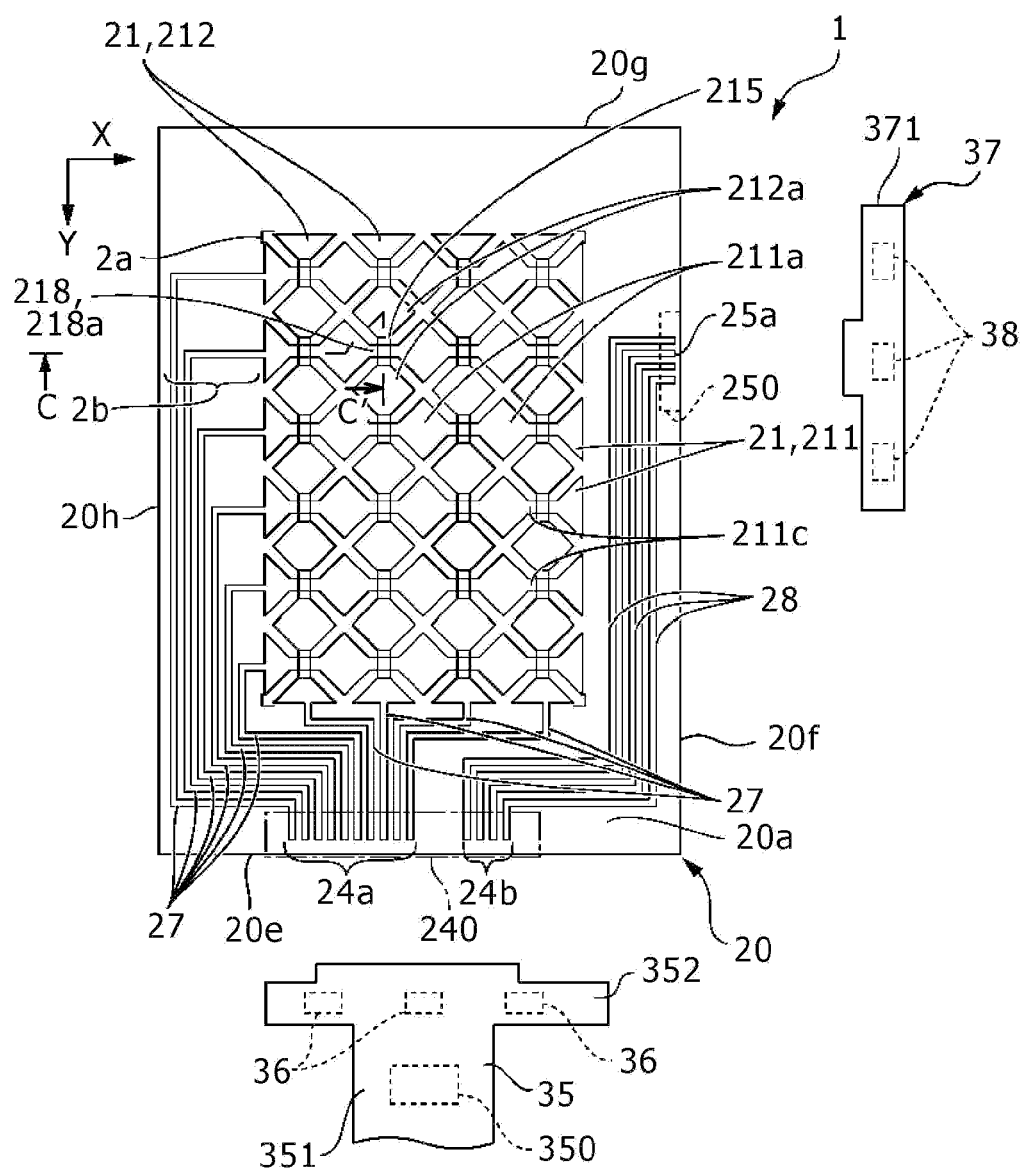
FIG. 4 is a schematic plan view similar to FIG. 3A, showing a modification of this preferred embodiment.

FIG. 4 is a plan view showing the configuration of a sensor substrate 20 and its associated parts used in an electrooptic device 100 according to a modification of the above preferred embodiment. The basic configuration of this modification is similar to that of the above preferred embodiment described with reference to FIGS. 1A to 3B. Therefore, the same parts as those shown in FIGS. 1A to 3B are denoted by the same reference symbols in FIG. 4, and the description thereof will be omitted herein.

In the configuration of the above preferred embodiment shown FIGS. 1A to 3B, the first and second flexible wiring boards 35 and 37 (wiring boards with touch sensors) are respectively connected to the opposite ends 20e and 20g of the sensor substrate 20 between which the input area 2a is formed. In contrast, according to this modification shown in FIG. 4, the first and second flexible wiring boards 35 and 37 are respectively connected to the adjacent ends 20e and 20f of the sensor substrate 20. With this configuration, the first and second touch sensors 36 and 38 are located along the adjacent ends of the input area 2a.

Other Preferred Embodiments

While two wiring boards with touch sensors are used in the above preferred embodiment, one or three or more wiring boards with touch sensors may be used to provide a touch sensor or touch sensors at one position or three or more positions.

While the first and second flexible wiring boards 35 and 37 connected to the touch panel 2 are defined as wiring boards with touch sensors in the above preferred embodiment, the flexible wiring board 73 connected to the electrooptic panel 5a may be defined as a wiring board with a touch sensor.

While the capacitance type touch panel 2 is provided with the capacitance type touch sensors 36 and 38 in the above preferred embodiment, the capacitance type touch panel 2 may be replaced by another type touch panel such as a resistance film type touch panel. Further, the capacitance type touch sensors 36 and 38 may be replaced by another type touch sensors such as resistance film type or pressure sensitive type touch sensors.

While a liquid crystal panel is used as the electrooptic panel 5a in the above preferred embodiment, a panel for an organic electroluminescent device may be used as the electrooptic panel 5a.

Applications to Electronic Equipment

Figure 5A:
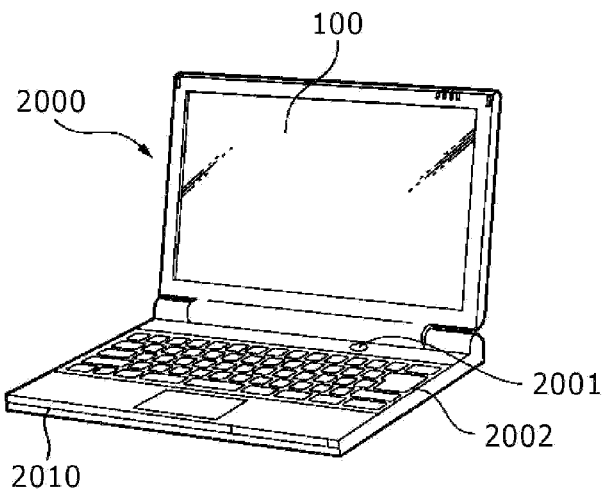
FIGS. 5A, 5B, and 5C are perspective views of various electronic equipment including the electrooptic device according to this preferred embodiment.
Figure 5B:
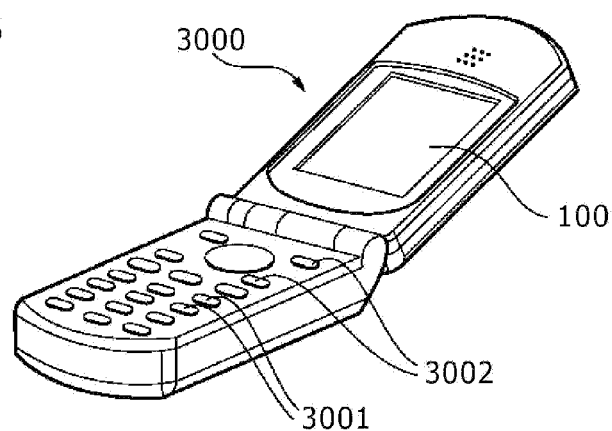
Figure 5C:
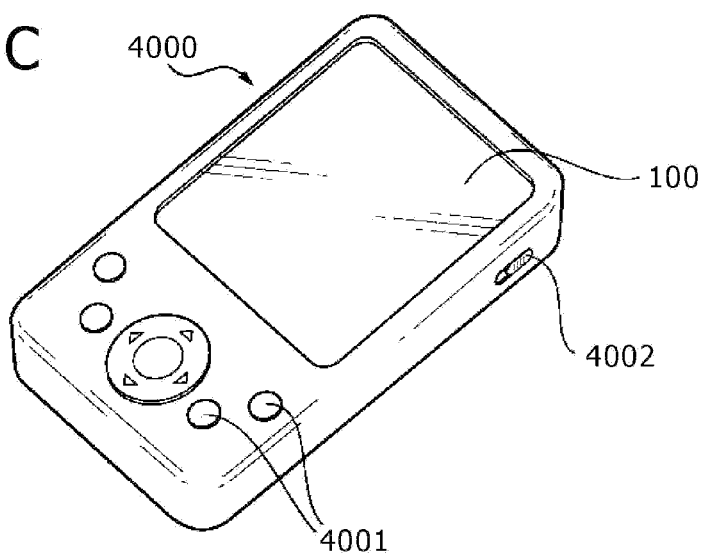

There will now be described electronic equipment to which the electrooptic device 100 according to the above preferred embodiment is applied. FIGS. 5A, 5B, and 5C are perspective views of such electronic equipment. More specifically, FIG. 5A shows the configuration of a mobile type personal computer 2000 having the electrooptic device 100. The personal computer 2000 has the electrooptic device 100 as a display unit and a body portion 2010. The body portion 2010 includes a power switch 2001 and a keyboard 2002. FIG. 5B shows the configuration of a mobile phone 3000 having the electrooptic device 100. The mobile phone 3000 has a plurality of operation buttons 3001, scroll buttons 3002, and the electrooptic device 100 as a display unit. By operating the scroll buttons 3002, the screen displayed on the electrooptic device 100 can be scrolled. FIG. 5C shows the configuration of a personal digital assistance 4000 having the electrooptic device 100. The personal digital assistance 4000 has a plurality of operation buttons 4001, a power switch 4002, and the electrooptic device 100 as a display unit. By operating the power switch 4002, various kinds of information such as an address book and a schedule book can be displayed on the electrooptic device 100.

Any applications of the electrooptic device 100 to electronic equipment other than those shown in FIGS. 5A to 5C may include a digital still camera, liquid crystal TV set, viewfinder type video tape recorder, direct-view monitor type video tape recorder, car navigation system, pager, electronic notepad, electronic desktop calculator, wordprocessor, workstation, TV phone, POS terminal, and bank terminal. The electrooptic device 100 according to this preferred embodiment is also applicable to these various electronic equipment.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An electrooptic device having an input function comprising:
   an electrooptic panel;
   a touch panel having an input position detecting electrode in an input area aligned to an image display area of the electrooptic panel; and
   a wiring board connected to the touch panel, the wiring board having a touch sensor located outside the input area of the touch panel as viewed from an input surface of the touch panel,
   wherein the wiring board includes
      a first wiring board connected to the touch panel and having a first touch sensor, and
      a second wiring board connected to the touch panel and having a second touch sensor;
   the first and second wiring boards are electrically connected to each other via a wiring that is provided to the touch panel and that carries a signal to and/or from the second touch sensor;
   the wiring is located outside the input area;
   a common driving IC is disposed on the first wiring board; and
   the signal between the second touch sensor and the common driving IC is transmitted via the wiring and the first wiring board.

2. The electrooptic device having an input function according to claim 1, wherein:
   the touch panel has a translucent board forming the input surface; and
   the input position detecting electrode and the touch sensor are located on the back side of the translucent board opposite to the input surface.

3. The electrooptic device having an input function according to claim 1, wherein:
   the first touch sensor is located along one end of the input area; and
   the second touch sensor is located along the other end of the input area opposite to the first touch sensor.

4. The electrooptic device having an input function according to claim 1, wherein the first wiring board is electrically connected to the input position detecting electrode.

5. The electrooptic device having an input function according to claim 1, wherein the first touch sensor and the second touch sensor are electrically connected to the common driving IC.

6. The electrooptic device having an input function according to claim 1, wherein a shape of the first wiring board is different from a shape of the second wiring board.

* * * * *